(No Model.)

W. A. PECK.
CHAIN.

No. 354,436. Patented Dec. 14, 1886.

WITNESSES:
Chas. H. Luther Jr
Willis Fowler

INVENTOR:
William A Peck
by Joseph A Miller & Co
Attorneys

UNITED STATES PATENT OFFICE.

WILLIAM A. PECK, OF PROVIDENCE, RHODE ISLAND, ASSIGNOR TO S. L. AND B. B. LEDERER, BOTH OF SAME PLACE.

CHAIN.

SPECIFICATION forming part of Letters Patent No. 354,436, dated December 14, 1886.

Application filed October 12, 1885. Serial No. 179,646. (No model.)

*To all whom it may concern:*

Be it known that I, WILLIAM A. PECK, of the city and county of Providence, and State of Rhode Island, have invented certain new and useful Improvements in Chains, of which the following is a full, clear, and exact description, reference being had to the accompanying drawings, forming a part of this specification.

My invention relates to chains which consist, in general, of a series of associated links interlocked and maintained together.

The use of solder in joining up the links of chains in jewelry causes discoloration of a considerable portion of the surfaces to which it is applied, and this necessitates much manual labor to remove the same and restore the metal to its original color.

My invention essentially consists in the association of chain-links which are provided with sleeves or casings surrounding the links longitudinally and are provided with bearing or holding means for engaging the casings at or near their ends, whereby the links hold and confine the casings in position, and the connected links are locked and maintained together as a chain by means of the casings, all as hereinafter fully described and claimed.

Figure 1:
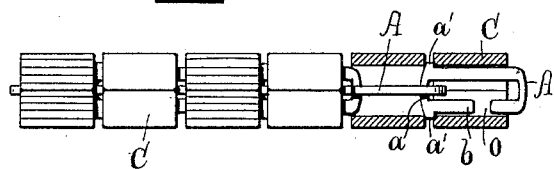
Figure 2:
Figure 3:
Figure 4:
Figure 5:
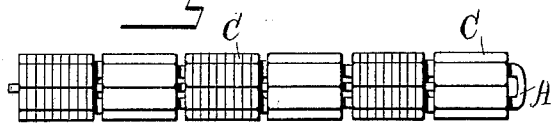
Figure 6:
Figure 7:
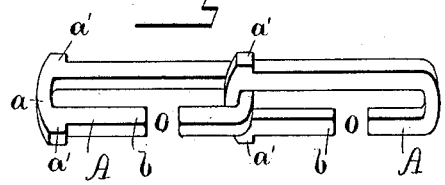

In the accompanying drawings, Figure 1 represents a portion of a chain with some of the sleeves broken away to show the engagement of the contained links. Fig. 2 is an end view of the same. Fig. 3 represents a portion of a chain of modified form. Fig. 4 is an end view of the same. Fig. 5 represents another modification. Fig. 6 represents an end view of the same. Fig. 7 represents, on an enlarged scale, a pair of links coupled.

In the drawings like letters designate like parts.

In the drawings, A designates an open link having its pintle-bar $a$, provided with lugs $a'$ $a'$, and the opening $o$ in the side bar of the link. The holding or bearing lugs $a'$, which afford bearings or resting-points for the casings, are shown as projecting laterally from the chain-link, near one end thereof, with the inner bearing or holding surfaces as flat and at right angles to the line of length of the link, and the outer corresponding bearing as somewhat curved relative thereto. These bearing-surfaces may, however, be varied to grooved or angular forms, as preferred. The sleeve C is a casing surrounding longitudinally each link, and of which the drawings show three modifications—viz., Fig. 1 shows a sleeve square in cross-section, and Figs. 3 and 5 show, respectively, a sleeve of circular and octagonal cross-section.

Figs. 2, 4, and 6 show the side bars of the links A A conforming to the contact-surfaces on the interior of the sleeves C C.

The chain is constructed by taking a single link, A, and incasing it in the sleeve C, which will rest on the lugs $a'$ $a'$ and leave the other end of the link projecting beyond the sleeve as a loop, through which the next entering-link is hooked by passing the hook $b$ therethrough and turning said latter link until the pintle-bar near the holding-lugs locks with the pintle-bar remote from the lugs on said former-link. A sleeve, C, is then placed over the latter link, and so this is repeated till the required length is reached. The associated links and their sleeves are secured together by the last sleeve C being soldered to its incased link A, or, in preference to this manner of binding the chain together permanently, another link A may be used without its sleeve; or any suitable means may be employed for maintaining the chain together, such as a ring or a bar. In the chain the lugs $a'$ $a'$ act also as distance-pieces for the sleeves C C.

There may be various modifications made in the several features of my invention without substantially departing from the spirit of the same, as herein described and claimed.

Having thus described my invention, I claim as new and desire to secure by Letters Patent—

1. In combination, a chain-link, a casing surrounding said link, bearing or resting means for holding said casing on said link, said means mounted on said link, and a next entering chain-link provided with bearing or resting means engaging said casing, whereby the casing may be held in position and may lock the links together.

2. In combination, a chain-link provided with lateral bearing or holding lugs, a casing surrounding said link longitudinally and bearing on said lugs, and an adjacent chain-link uniting with said first link and provided with lateral bearing or holding lugs, the lugs on the second link engaging said casing, whereby the casing may be maintained in position around the first link and the links may be locked together.

3. In combination, an open chain-link provided near one end with laterally-disposed bearing or holding lugs, a casing or sleeve surrounding longitudinally said link and partially incasing the length of the link, one end of said casing engaging said lugs, and an adjacent open chain-link provided with laterally-projecting bearing or holding lugs near one end, the lugs on said second link engaging the other end of said casing, whereby the casing may be maintained in position and may lock the connected links together.

4. A chain composed of a series of chain-links and incasing-sleeves associated as follows: a link provided with lateral bearing or holding lugs, a casing or sleeve surrounding said link, one end of said casing engaging said lugs, and the next entering link provided with bearing or holding lugs, the other end of said casing engaging the lugs on said next link, and so on for the series, whereby the casings may be securely maintained in their positions and the links may be locked securely together and the holding-lugs may act as spacing-pieces for the casings.

5. The combination of the links A A, having the pintle-bars $a\ a$, provided with lugs $a'\ a'$, and the sleeve C, substantially as and for the purpose described.

6. In combination, a link, A, having one pintle-bar, as $a$, provided with laterally-disposed holding-lugs $a'\ a'$, and one side bar open, as at O, a sleeve, C, incasing said link and resting with one end on said lugs $a'\ a'$, and another similar link A, as described, interlocking with said first link, and with its holding-lugs bearing against the adjacent end of said sleeve C, substantially as described.

WILLIAM A. PECK.

Witnesses:
WILLIS FOWLER,
M. F. BLIGH.